US007889730B1

(12) United States Patent
Albo (10) Patent No.: US 7,889,730 B1
(45) Date of Patent: Feb. 15, 2011

(54) COMPRESSION AND DECOMPRESSION FOR NETWORK SYSTEMS

(75) Inventor: Abraham Albo, Margarita, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

(21) Appl. No.: 12/684,054

(22) Filed: Jan. 7, 2010

Related U.S. Application Data

(63) Continuation of application No. 11/669,775, filed on Jan. 31, 2007, now Pat. No. 7,668,162.

(51) Int. Cl.
*H04L 12/28* (2006.01)
*H04L 12/56* (2006.01)

(52) U.S. Cl. ..................................... 370/389

(58) Field of Classification Search ........................ None
See application file for complete search history.

(56) References Cited

U.S. PATENT DOCUMENTS

| 5,126,739 | A | 6/1992 | Whiting et al. |
| 5,627,829 | A | 5/1997 | Gleeson et al. |
| 6,151,627 | A | 11/2000 | McBride et al. |
| 6,795,497 | B1 | 9/2004 | Shalem |
| 7,010,719 | B2 | 3/2006 | Nobuyoshi et al. |
| 2008/0056249 | A1 | 3/2008 | Ocko et al. |

OTHER PUBLICATIONS

"Office Action from USPTO dated July 24, 2009 for U.S. Appl. No. 11/669,775".
"Notice of Allowance from USPTO dated December 30, 2009 for U.S. Appl. No. 11/669,775".

*Primary Examiner*—Ayaz R Sheikh
*Assistant Examiner*—Blanche Wong
(74) *Attorney, Agent, or Firm*—Klein, O'Neill & Singh, LLP (57) ABSTRACT

Method and system for processing a source protocol data unit (PDU) is provided. The method includes receiving the source PDU at a local router; determining whether to compress the source PDU or process the source PDU without compression; compressing the source PDU and setting a flag indicating that the source PDU is compressed; and transmitting the compressed source PDU via a network link. The system includes a host system that generates a source PDU; a local router that receives the source PDU and determines whether to compress the source PDU or process the source PDU without compression; compresses the source PDU and sets a flag indicating that the source PDU is compressed; and transmits the compressed source PDU via a network link to a remote router.

20 Claims, 7 Drawing Sheets

| | Buffer |
|---|---|
| PDU (Packet N+1)<br>Header (Packet N+1)<br>Init Flag: 0<br>Checksum ; Version #;<br>Size | (Packet N+1) Buffer N |
| PDU (Packet N)<br>Header (Packet N)<br>Init Flag: 0<br>Checksum ; Version #;<br>Size | (Packet N) Buffer N-1 |
| PDU (Packet _)<br>Header<br>Init Flag: 0<br>Checksum ; Version #;<br>Size | \| <br> \| <br> \| |
| PDU (Packet 2)<br>Header (Packet 2)<br>Init Flag: 0<br>Checksum ; Version #;<br>Size | (Packet 2) Buffer 3 |
| PDU (Packet 1)<br>Header (Packet 1)<br>Init Flag: 0<br>Checksum ; Version #;<br>Size | (Packet 1) Buffer 2 |
| PDU (Packet 0)<br>Header (Packet 0)<br>Init Flag: 1<br>Checksum ; Version #;<br>Size | (Packet 0) Buffer 1 | t1 t0
Reinitialize History

COMPRESSION AND DECOMPRESSION FOR NETWORK SYSTEMS

BACKGROUND

1. Field of the Invention

This application is a continuation of U.S. application Ser. No. 11/669,775, filed Jan. 31, 2007, now U.S. Pat. No. 7,668,162. The present invention relates to networks, and more particularly, to compressing and decompressing network data.

2. Background of the Invention

Computer networks are commonly used. Storage area networks ("SANs") are a type of computer network used to store and access data. A SAN maintains a sub-network of shared storage devices, for example, disks and tape drives. A computer system (may also be referred to as a "host") can access data stored in the SAN.

Typical SAN architecture makes storage devices available to all servers that are connected using a computer network, for example, a local area network or a wide area network. The term server in this context means any computing system or device coupled to a network that manages network resources. For example, a file server is a computer and storage device dedicated to storing files. Any user on the network can store files on the server.

Conventional compression algorithms have been designed to operate on big data chunks (blocks) and are not efficient for data packets or frames (for example, Fibre Channel frames). In conventional systems, a compressor is provided with input buffers to handle compression of big data chunks. Typically, the compressor clears compression history and writes data to output buffers. A list of recurring tokens is cached, and the token cache may be referred to as compression history. The compressor computes checksum over the output. The output data is then transmitted.

In high data rate networks (for example, 10 Gb) it is undesirable to aggregate frames in a buffer and then compress the aggregated frames because that will increase latency and reduce overall network throughput. Therefore, there is a need for efficient compression and decompression systems and methods for compressing and decompressing network information at a packet (or frame) level.

SUMMARY OF THE INVENTION

In one aspect, a method for processing a source protocol data unit (PDU) is provided. The method includes receiving the source PDU at a local router; determining whether to compress the source PDU or process the source PDU without compression; compressing the source PDU and setting a flag indicating that the source PDU is compressed; and transmitting the compressed source PDU via a network link.

In another aspect, a network system, is provided. The system includes a host system that generates a source PDU; a local router that receives the source PDU and determines whether to compress the source PDU or process the source PDU without compression; compresses the source PDU and sets a flag indicating that the source PDU is compressed; and transmits the compressed source PDU via a network link to a remote router.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the various aspects of this disclosure will now be described with reference to the drawings of the illustrated embodiment(s). In the drawings, the same components have the same reference numerals. The illustrated embodiments are intended to illustrate, but not to limit the invention. The drawings include the following Figures.

DETAILED DESCRIPTION

To facilitate an understanding of the adaptive aspects of the present invention, the general architecture and operation of a SAN using storage devices will be described. The specific architecture and operation of the preferred embodiment will then be described with reference to the general architecture.

Before describing the general architecture, the following provides a brief introduction to various standard protocols (may also be referred to as an interface) (for example, Fibre Channel) that may be used to move information in a SAN. The term information as used herein includes, data packets, frames, protocol data units (PDUs) (may also be referred to as command data blocks (CDBs), used interchangeably throughout this specification) and the like. The information format depends on the type of protocol used by the network devices.

Fibre Channel (incorporated herein by reference in its entirety) is an American National Standard Institute (ANSI) set of standards, which provides a serial transmission protocol for storage and network protocols such as HIPPI, SCSI, IP, ATM and others. Fibre Channel provides an input/output (I/O) interface for both channel and network users.

Figure 1:
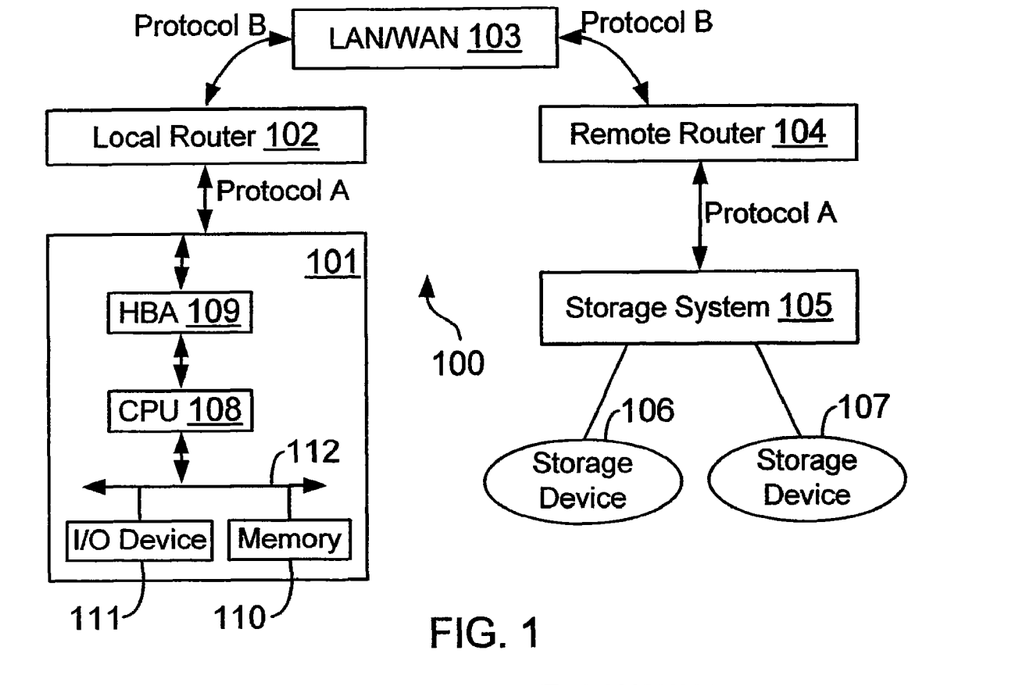
FIG. 1 shows a block diagram of a network topology, used according to one aspect of the present invention.

FIG. 1 shows a top-level block diagram of a network system 100. Network system 100 includes a computing system (host) 101 that is coupled to a router 102 via network interface 109 (shown as HBA). Router 102 is labeled as a local router because it is geographically closer to host 101 than router 104 (labeled as remote router). Local router 102 is coupled to a local area network or a wide area network 103, which is coupled to remote router 104.

Storage system 105 is coupled to remote router 104. Functionally, remote router 104 is a local router for storage system 105. Storage system 105 is operationally coupled to storage devices 106/107. Although only two storage devices have been shown, system 100 may include any number of storage devices. Furthermore, although only one host 101 and storage system 105 are shown, system 100 may include any number of hosts and storage systems.

Local router 102 and remote router 104 have hardware and software (firmware) to route network packets (or frames) between plural network devices.

Host system 101 may send PDUs (source PDU) that are compliant with a protocol (shown as Protocol A, for example, the Fibre Channel protocol) and local router 102 then wraps source PDUs in a PDU that is compliant with another protocol (shown as Protocol B, for example, the TCP/IP network protocol suite, incorporated herein by reference in its entirety).

Remote router 104 receives a PDU that is compliant with Protocol B and extracts the PDU that is compliant with Protocol A. Remote router 104 then sends the PDU compliant with Protocol A to storage system 105.

Although the example in FIG. 1 shows two different Protocols A and B, the adaptive aspects described herein are not limited to any particular protocol and in some instances, Protocol A and B may be the same.

Host system 101 typically includes several functional components. These components may include a central processing unit (CPU) 108, main memory 110, input/output ("I/O") devices 111, and network interface 109. Main memory 110 is coupled to CPU 108 via a system bus 112 or a local memory bus (not shown). Main memory 110 is used to provide CPU 108 access to data and program information that is stored in main memory 110 at execution time. Typically, main memory 110 is composed of random access memory (RAM) circuits.

Read only memory (ROM, not shown) is provided to store invariant instruction sequences such as start-up instruction sequences or basic input/output operating system (BIOS) sequences.

Network interface 109 facilitates network communication between host 101 and other devices, for example, storage system 105. Network interface 109 includes hardware/software modules to handle such network communication.

Figure 2A:
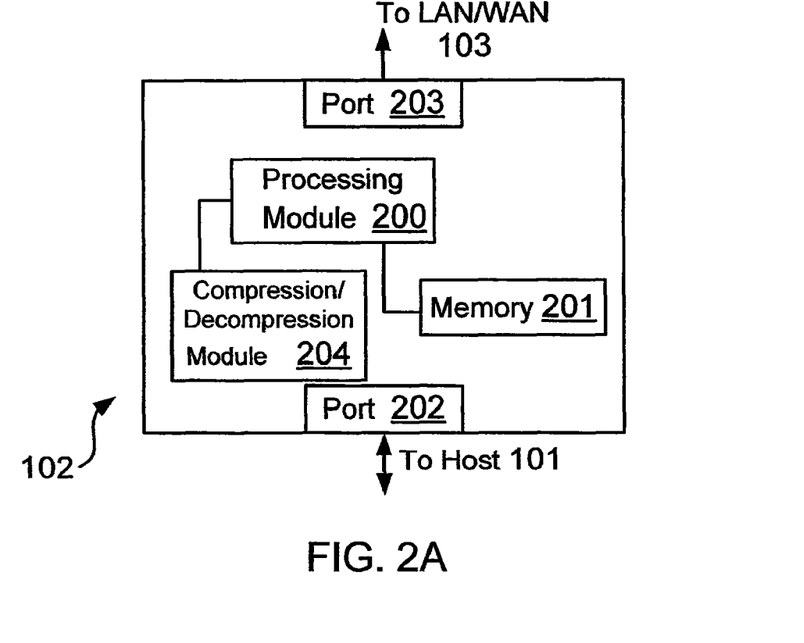
FIG. 2A is a block diagram of a router used in one embodiment.

FIG. 2A shows a top-level block diagram of a router (102 or 104, operating as a local or remote router) used according to one aspect of the present disclosure. Router 102 includes a processor (also referred to as Processing Module) 200 with access to memory 201. Processor 200 executes firmware (software) instructions out of memory 201 to perform various router functions. Ports 202 and 203 support communication between host 101 and LAN/WAN 103, respectively.

Router 102 also includes a compression/decompression module 204 (may also be referred to as module 204) that is used to compress and de-compress data packets for achieving better throughput, as described below. Module 204 may be implemented in hardware, software, or a combination thereof.

Figure 2B:
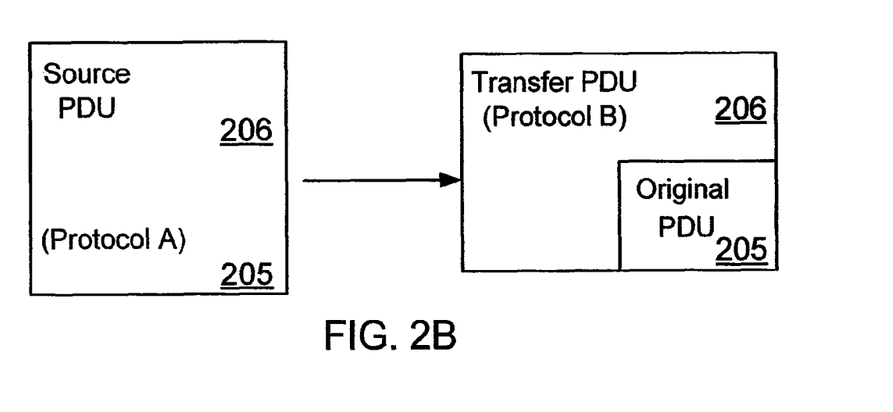
FIG. 2B shows a block diagram with an original PDU embedded in a transfer PDU, according to one embodiment.

FIG. 2B shows an example of an original PDU (may also be referred to as "source PDU") 205 received from a host system, which is compliant with Protocol A. Local router 102 creates a transfer PDU 206 that is compliant with Protocol B and includes source PDU 205. Remote router 104 extracts source PDU 205 after it receives transfer PDU 206.

Figure 2C:
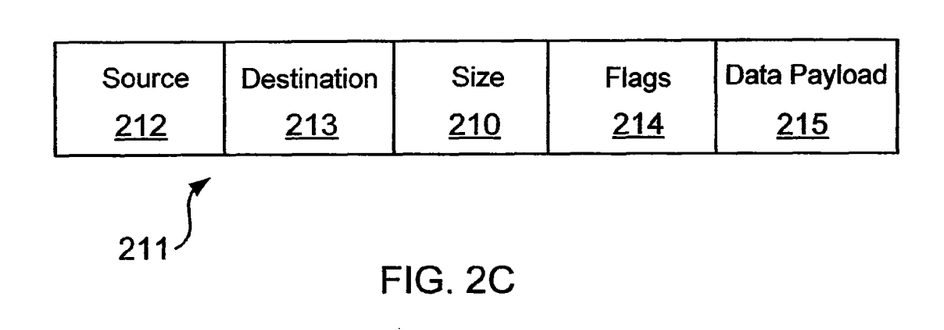
FIG. 2C shows a format used for uncompressed network data.

FIG. 2C shows an example of an uncompressed PDU 211 (similar to source PDU 205) format. The uncompressed PDU includes a source field 212 that indicates PDU source; a destination field 213 that indicates the destination for the PDU; a size field 210 that includes the size of the PDU, flags 214, which may have information indicating that the PDU is uncompressed, and uncompressed data payload 215. The format for the plural fields shown in FIG. 2C will depend on the type of protocol for source PDU 211.

Figure 2D:
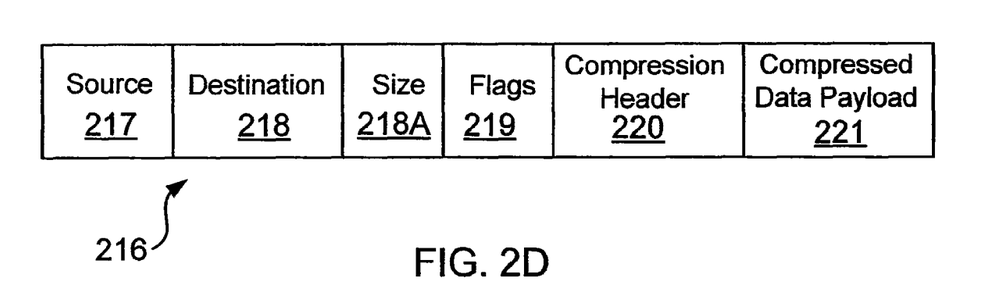
FIG. 2D shows a format for compressed data, according to one embodiment.

FIG. 2D shows an example of PDU 216, according to one embodiment. PDU 216 includes a source field 217, destination field 218, field 218A indicating the PDU size and flags 219. Flags 219 include a flag (or bit value) that indicates if PDU 216 is compressed. Compression header 220 includes information regarding compression type; version number (if any) and original (i.e. uncompressed) PDU size (210, FIG. 2C). Compression header 220 information is used by a node (for example, router 104) to decompress PDU 216. Compressed Data payload 221 is also a part of PDU 216.

Figure 3:
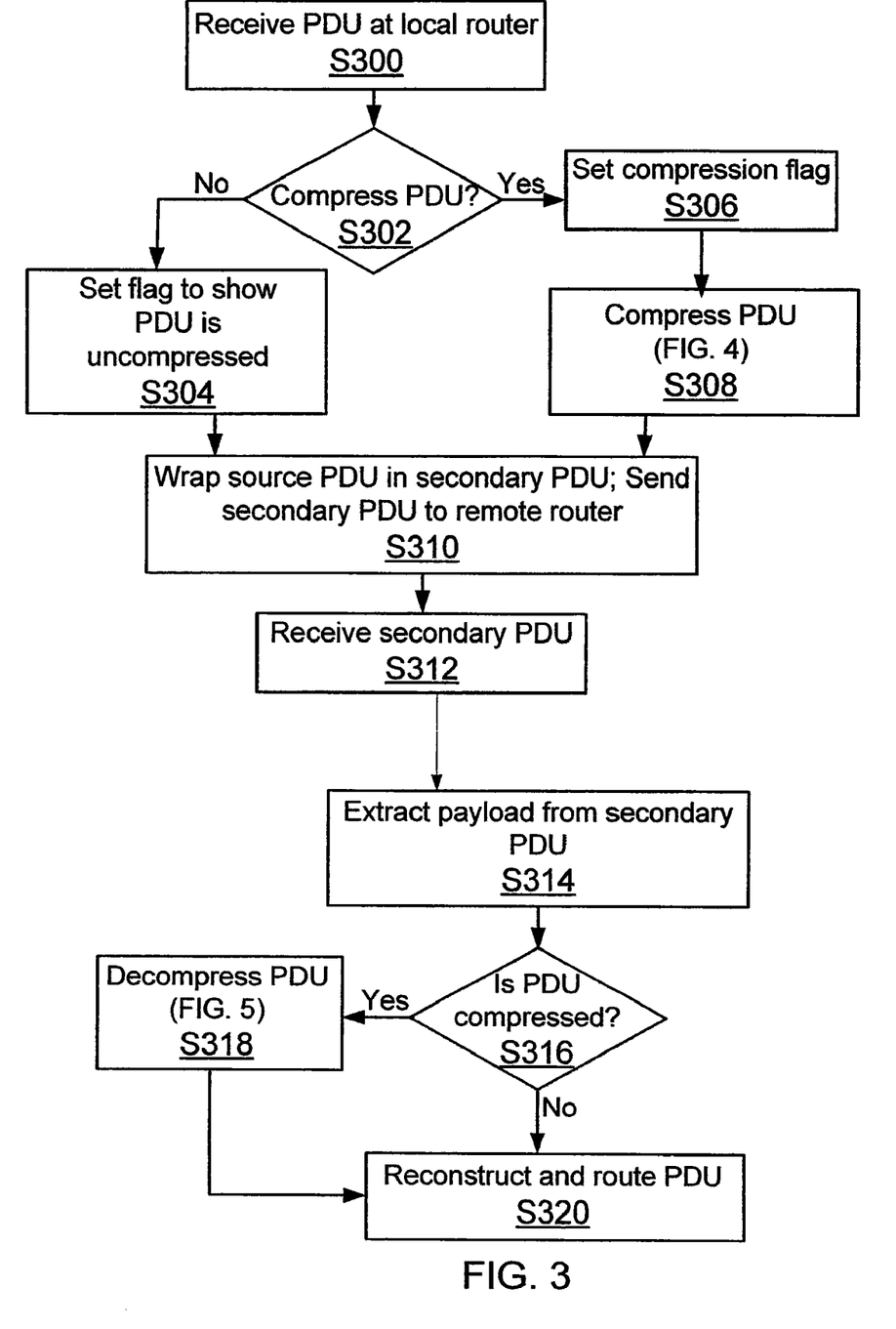
FIG. 3 shows top-level flow diagram for compressing and decompressing information, according to one embodiment.

FIG. 3 shows a process flow diagram for compressing and decompressing PDUs, according to one embodiment. The process starts in step S300, when a local router 102 receives a source PDU. In step S302, local router 102 determines if a PDU should be compressed. If compression is not performed, then in step S304, local router 102 sets a flag (219) that identifies the source PDU as an uncompressed PDU.

If compression is to be performed, then in step S306, a flag (219) is set that indicates a compressed PDU and in step S308, the PDU is compressed, as described below with respect to FIG. 4. It is noteworthy that steps S306 and S308 may occur in any order.

In step S310, the source PDU is wrapped in a transfer (may also be referred to as secondary) PDU (shown as 206, FIG. 2B) that also includes a flag indicating if the PDU is compressed or uncompressed. The secondary PDU is then sent to remote router 104.

As described above, source PDU and secondary PDU may be based on different or similar network protocols.

Remote router 104 receives the secondary PDU in step S312. In step S314, remote router 104 extracts the payload from the secondary PDU.

In step S316, remote router 104 determines if the secondary PDU is compressed or uncompressed. Remote router 104 determines that by evaluating flag 219 that indicates a compressed or uncompressed PDU. If the secondary PDU is uncompressed, the process moves to step S320.

If the secondary PDU is compressed, then in step S318, the PDU is decompressed, described below with respect to FIG. 5. Thereafter, in step S320, the PDU is reconstructed and routed to its destination.

Figure 4A:
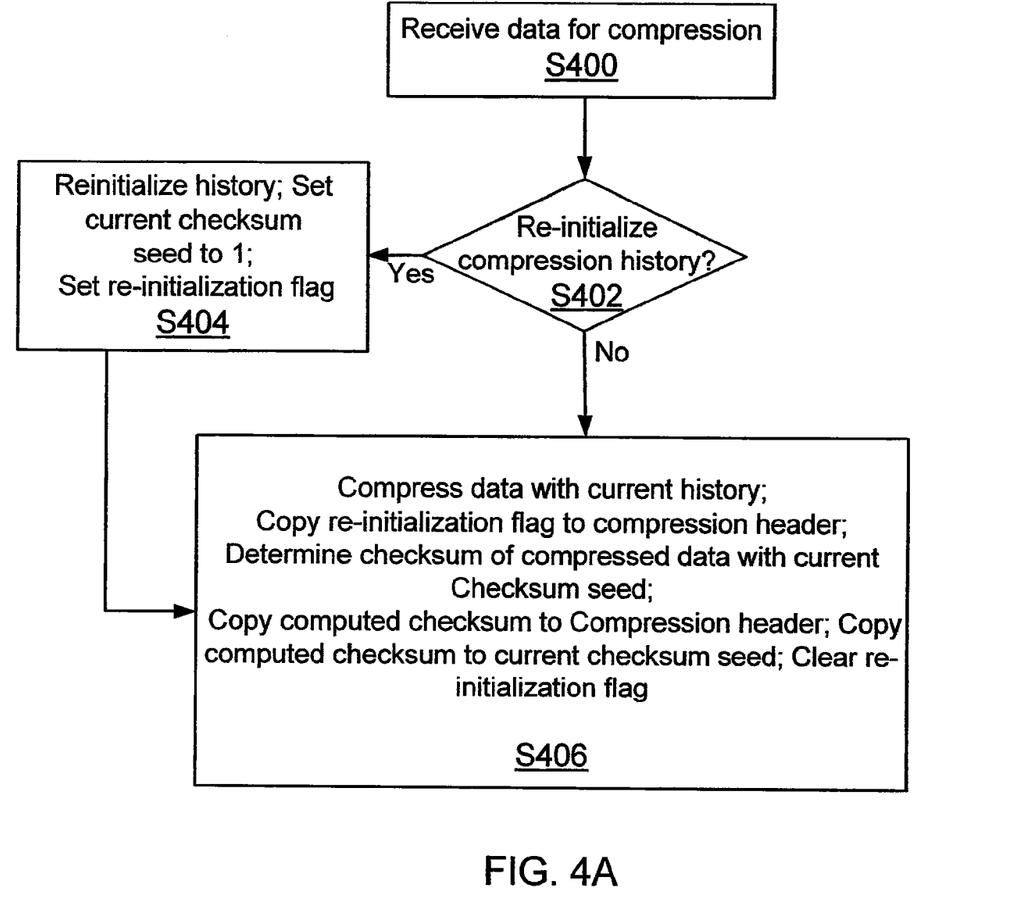
FIG. 4A shows a flow diagram for compressing information.

FIG. 4A shows a process flow diagram for compressing PDUs, according to one embodiment. The process starts in step S400, when a source PDU is received for compression. The operating system or management system allocates buffers (storage space) for handling PDU compression. The buffers may be PDU/compression. The buffers may be located in memory 201. These buffers are typically smaller in size compared to buffers used by larger systems that do not perform packet (or frame by frame) compression. In step S402, module 204 determines if compression history should be reinitialized. Compression history includes recurring tokens that are used to compress PDUs. Compression history may be stored in memory 201 and includes information regarding previously compressed PDUs. The format and layout of compression history will depend on the type of compression algorithm used by Module 204.

If compression history needs to be reinitialized, then in step S404, compression history is reinitialized (i.e. cleared), the checksum seed is reinitialized (for example, to 1) and a flag (219) is set in the PDU header that shows re-initialization was performed.

In step S406, data is compressed based on current history at that instance. The re-initialization flag is copied to the compression header. The value of the re-initialization flag depends on the outcome of step S402. A checksum of the compressed data is performed using the current checksum seed. The value of the checksum is copied into the compression header and into the current checksum seed. After copying the current re-initialization flag into the compression header, the local re-initialization flag is cleared.

Figure 4B:
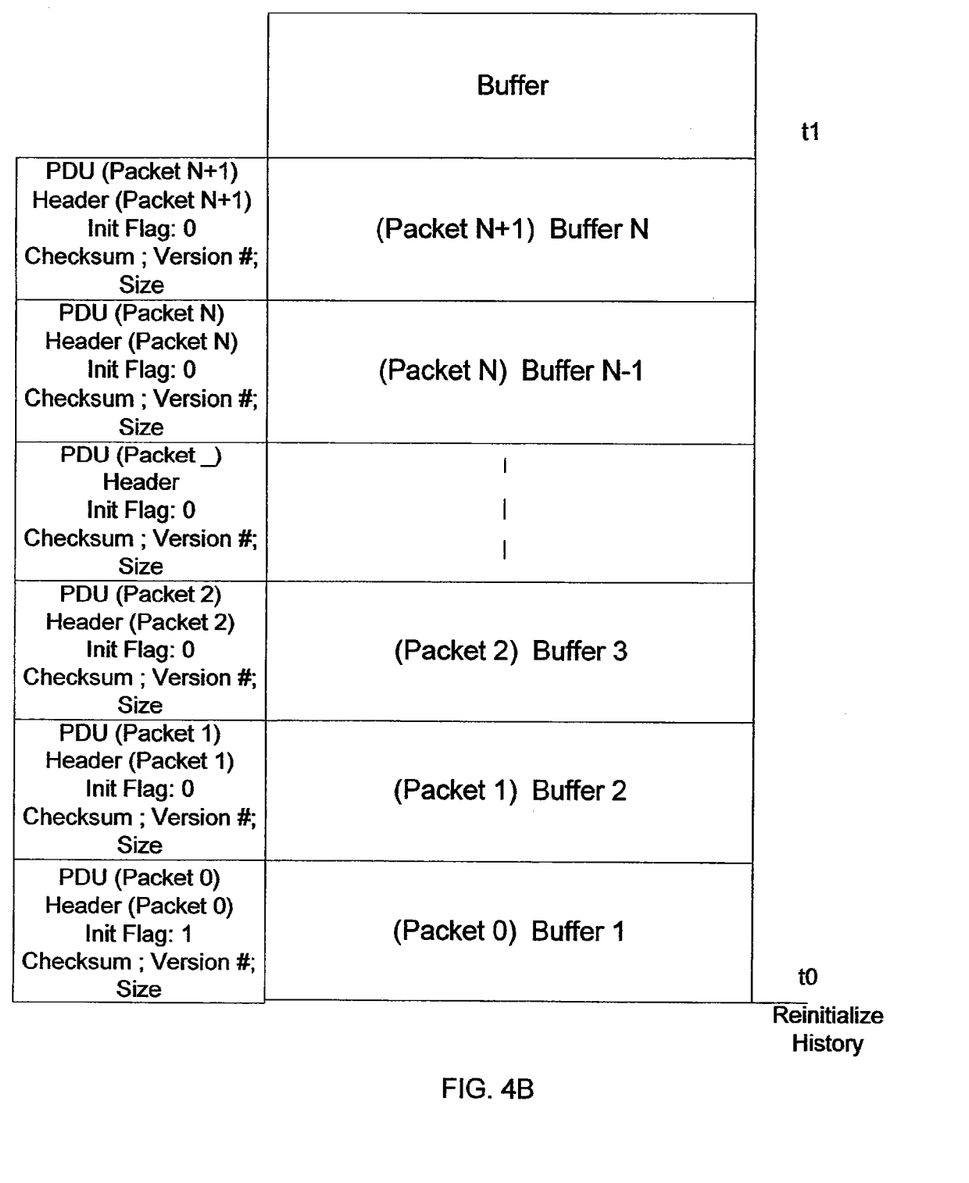
FIG. 4B shows an example of how buffers are used for compression/decompression, according to one embodiment.

The checksum is determined over compressed blocks from the instance when compression history is re-initialized. This is shown in FIG. 4B that shows memory buffers 201A in memory 201.

Compression history is reinitialized at time t0. When the first packet (shown as Packet 0) is placed in Buffer 1, the checksum for that packet is determined based on Packet 0 itself. After Packet 0 is compressed, the PDU includes a flag (shown as Init=1) that indicates when history was initialized.

When the second packet (shown as Packet 1) is placed in Buffer 2, the checksum for Packet 0 is used as a base for determining checksum for Packet 1. The PDU for Packet 1 includes an Init flag whose value is 0, which indicates that history has not been reinitialized. This process continues, until the Nth buffer. In this case, the checksum for N−1 buffers is used as a base for determining the checksum for Packet N+1 in Buffer N. Thus this process allows router 102 to send compressed frames in real-time, instead of waiting to accumulate certain number of frames.

Figure 5A:
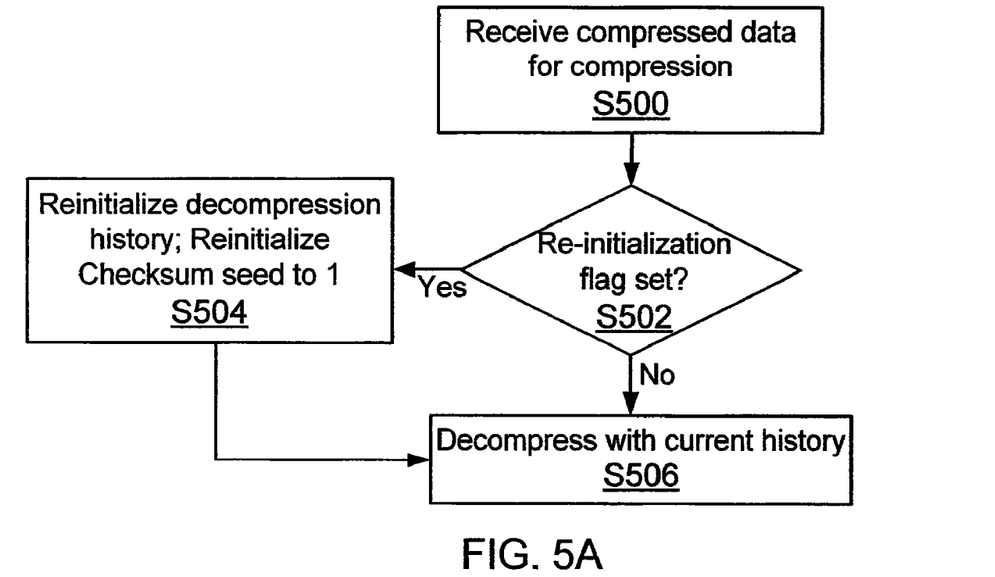
FIG. 5A shows a flow diagram for decompressing information, according to one embodiment.

FIG. 5A shows a top-level process flow diagram for decompression, according to one embodiment. The process starts in step S500 when compressed data is received in step S500. In step S502, module 204 determines if the re-initialization flag was set (step S402, FIG. 4). If yes, then in step S504, decompression history is reinitialized and the cumulative checksum is reset. This may be achieved by setting a checksum seed to 1.

Figure 5B:
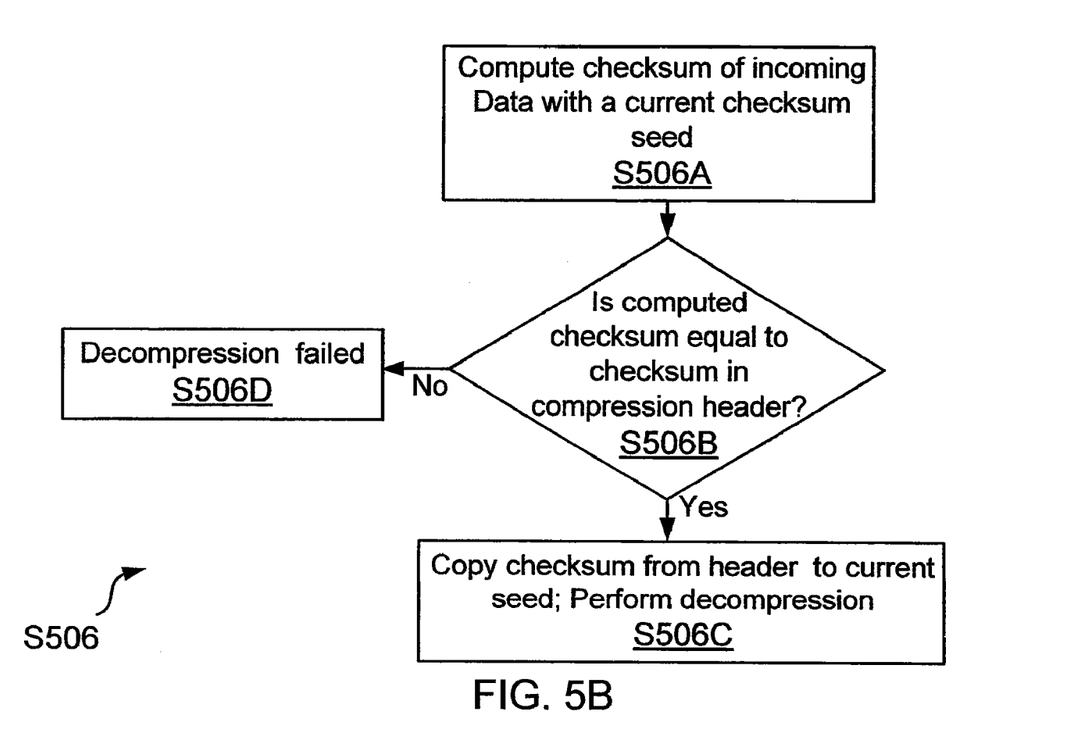
FIG. 5B shows a process flow diagram for step S506 of FIG. 5A.

In step S506, decompression is performed based on current history, as described below with respect to FIG. 5B. In step S506A, module 204 computes a checksum of incoming compressed PDU using a copy of a current checksum seed. In step S506B, the computed checksum is compared to a checksum in a received compression header. If the checksum is different, then the decompression fails (step S506D).

If the checksum value matches in step S506B, then in step S506C, the computed checksum is copied into a current decompression seed value and decompression is performed based on a decompression algorithm.

The checksum process helps to determine if an incoming PDU is corrupt; whether a PDU belongs to a stale network connection or has been received out of order.

Figure 6:
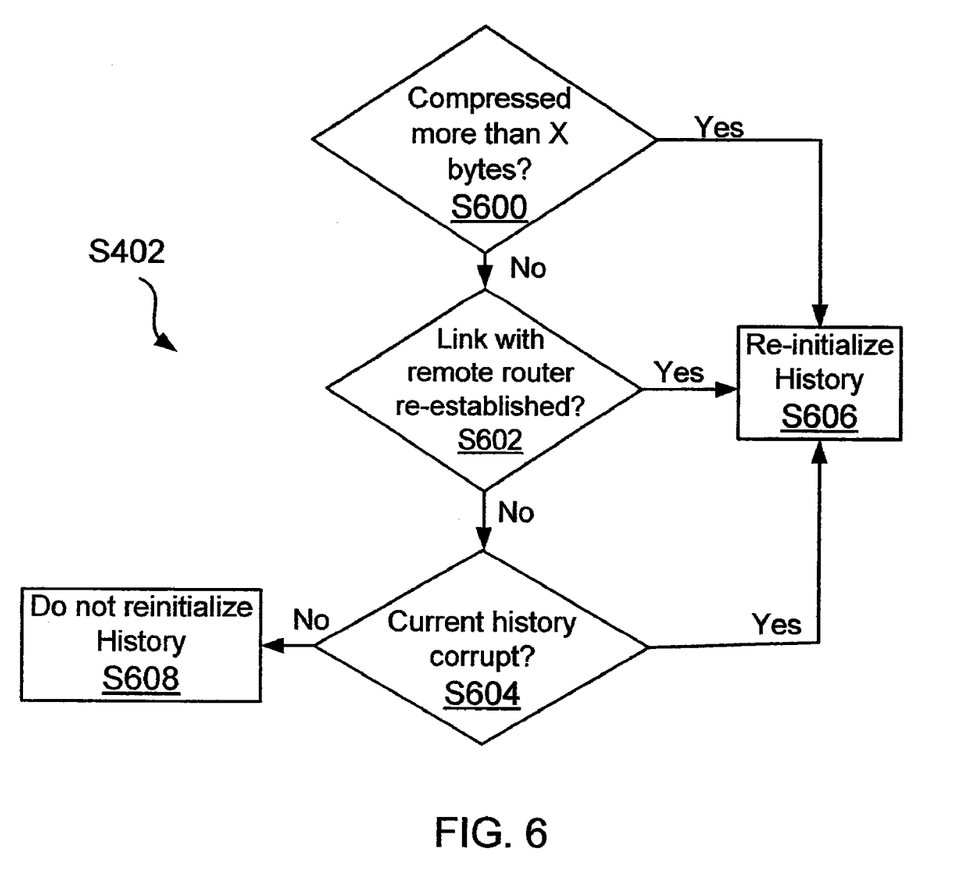
FIG. 6 shows a process flow diagram for reinitializing (Step S402, FIG. 4) compression history, according to one embodiment.

FIG. 6 shows a process flow diagram for "re-initialize compression history" step S402 (FIG. 4), according to one embodiment. The example shown in FIG. 6 illustrates certain conditions for re-initialization. However, the adaptive aspects are not limited to the stated conditions.

The process that determines whether to re-initialize compression history starts in step S600, when module 204 determines if it has compressed more than a threshold number of bytes, for example, 64 k. If yes, then the compression history is reinitialized. If no, then in step S602, module 204 determines if a link with a remote router (104) has been re-established. If yes, then the process moves to step S606. If not, then in step S604; module 204 determines if current history at any given time may be corrupt. If yes, then the process moves to step S606. If not, then the process moves to step S608, where re-initialization should not occur.

The following provides an example of compressing a frame, for example, a 2 k Fibre Channel frame. Each frame is sent to module 204, before it is sent out to remote router 104 and each compressed frame includes a compression header (220, FIG. 2) as shown below:

typedef struct
{
unsigned long adler32; [Signature]
unsigned int first:1; [Notifies router 104 to reinitialize history]
unsigned int qlogicversion:3; [Identifies Compression Version Number]
/* 0 means 16K */
unsigned int original_lth:14; [Identifies original length]
unsigned int compressed_lth:14; [Identifies compressed length]
}qlogic_fcip_compress head t;

(d) Data is divided into chunks or blocks, for example, approximately in 64K bytes. The "first" bit is set only for the first frame in the chunk. The adler32 checksum (a type of checksum algorithm) is then initialized to 1, and computed over the first compressed frame.

(e) On each subsequent frame, the "first" bit is cleared. Adler32 is then computed cumulatively from the first frame in the chunk.

(f) A receiver (for example, router 104) checks the header it received with the data. If the "first" bit is set, the receiver re-initializes its decompress history and resets its own adler32 checksum to 1. Otherwise, it uses the old decompression history and old adler32 checksum to validate the received frame and decompress it.

(g) Whenever the module 204 runs into a compression problem, it reinitializes its side of the compression. This means that the next compressed frame it sends out will be the beginning of a new compression chunk with "first" bit set to 1 and adler32 initialized at 1. Examples of conditions that require initialization are: if a current chunk is already bigger than a certain size, for example, 64 k; module 204 decided not to compress due to error; and connection between local router 102 and remote router 104 had to re-initiated.

In one aspect, compression is performed for small data size, instead of larger chunks efficiently. Also, data loss is limited to a smaller chunk size, for example, 64 k.

Although the present invention has been described with reference to specific embodiments, these embodiments are illustrative only and not limiting. Many other applications and embodiments of the present invention will be apparent in light of this disclosure and the following claims.

What is claimed is:

1. A method for processing a protocol data unit, comprising:
   receiving the protocol data unit at a router;
   the router determining whether to compress the protocol data unit or send the protocol data unit to a network without compression;
   if the protocol data unit is to be compressed, the router determining whether to re-initialize compression history;
   if compression history is to be re-initialized, the router re-initializing compression history for compressing the protocol data unit;
   the router compressing the protocol data unit and setting a flag indicating that the protocol data unit is compressed and transmitting the compressed protocol data unit via a network link.

2. The method of claim 1, wherein if compression history is not to be re-initialized, the router compresses the protocol data unit using a current compression history.

3. The method of claim 1, wherein the protocol data received by the router is based on a first protocol.

4. The method of claim 3, wherein the router wraps the protocol data unit in a secondary protocol data unit that is based on a second protocol and sends the secondary protocol data unit to another router.

5. The method of claim 4, wherein the first protocol and the second protocol are different.

6. The method of claim 4, wherein the other router examines a flag in the secondary protocol data unit and extracts a payload from the secondary protocol data unit.

7. The method of claim 6, wherein the other router decompresses the payload.

8. The method of claim 6, wherein the other router reconstructs the protocol data unit from the decompressed payload.

9. A network system, comprising:
   a computing system for generating a protocol data unit; and
   a first router that receives the protocol data unit and determines whether to compress the protocol data unit or send the protocol data unit to a network without compression; if the protocol data unit is to be compressed, the first router determines whether to re-initialize compression history; and if compression history is to be re-initialized, the first router re-initializes compression history for compressing the protocol data unit; compresses the protocol data unit; sets a flag indicating that the protocol data unit is compressed; and transmits the compressed protocol data unit via a network link.

10. The system of claim 9, wherein if compression history is not to be re-initialized, the first router compresses the protocol data unit using a current compression history.

11. The system of claim 9, wherein the protocol data unit received by the first router is based on a first protocol.

12. The system of claim 11, wherein the first router wraps the protocol data unit in a secondary protocol data unit that is based on a second protocol and sends the secondary protocol data unit to a second router.

13. The system of claim 12, wherein the first protocol and the second protocol are different.

14. The system of claim 12, wherein the second router examines a flag in the secondary protocol data unit and extracts a payload from the secondary protocol data unit.

15. The system of claim 14, wherein the second router decompresses the payload.

16. The system of claim 15, wherein the second router reconstructs the protocol data unit from the decompressed payload.

17. A router, comprising:
   a compression/decompression module for compressing and decompressing a protocol data unit; wherein the router receives the protocol data unit and determines whether to compress the protocol data unit or send the protocol data unit to a network without compression; if the protocol data unit is to be compressed, the router determines whether to re-initialize compression history; if compression history is to be re-initialized, the router re-initializes compression history for compressing the protocol data unit; compresses the protocol data unit; sets a flag indicating that the protocol data unit is compressed; and transmits the compressed protocol data unit via a network link.

18. The router of claim 17, wherein the router wraps the protocol data unit as a secondary protocol data unit that is based on a protocol different from a protocol that was used for sending the protocol data unit to the router and sends the secondary protocol data unit to another router.

19. The router of claim 18, wherein the second router examines a flag in the secondary protocol data unit and extracts a payload from the secondary protocol data unit.

20. The router of claim 19, wherein the second router decompresses the payload and reconstructs the protocol data unit from the decompressed payload.

* * * * *

UNITED STATES PATENT AND TRADEMARK OFFICE
CERTIFICATE OF CORRECTION

| | | |
|---|---|---|
| PATENT NO. | : 7,889,730 B1 | Page 1 of 1 |
| APPLICATION NO. | : 12/684054 | |
| DATED | : February 15, 2011 | |
| INVENTOR(S) | : Abraham Albo | |

It is certified that error appears in the above-identified patent and that said Letters Patent is hereby corrected as shown below:

In column 4, lines 48-49, after "compression." delete "The buffers may be PDU/compression.".

In column 6, line 66, in Claim 3, after "data" insert -- unit --.

Signed and Sealed this
Twenty-first Day of June, 2011

David J. Kappos
*Director of the United States Patent and Trademark Office*